United States Patent
Bottacini

(10) Patent No.: US 10,184,551 B2
(45) Date of Patent: Jan. 22, 2019

(54) ACTUATING DEVICE OF THE TYPE PROVIDED WITH AN ACTUATING ELEMENT AND MEANS FOR MANUALLY OPERATING THE ACTUATING ELEMENT

(71) Applicant: PNEUMAX S.p.A., Milan (IT)

(72) Inventor: Roberto Bottacini, Lurano (IT)

(73) Assignee: PNEUMAX S.p.A., Milan (IT)

( * ) Notice: Subject to any disclaimer, the term of this patent is extended or adjusted under 35 U.S.C. 154(b) by 60 days.

(21) Appl. No.: 15/223,065

(22) Filed: Jul. 29, 2016

(65) Prior Publication Data

US 2017/0030442 A1  Feb. 2, 2017

(51) Int. Cl.
| | |
|---|---|
| *B25B 5/06* | (2006.01) |
| *B25B 5/08* | (2006.01) |
| *B25B 5/12* | (2006.01) |
| *F16H 21/44* | (2006.01) |

(52) U.S. Cl.
CPC .............. *F16H 21/44* (2013.01); *B25B 5/064* (2013.01); *B25B 5/08* (2013.01); *B25B 5/12* (2013.01); *B25B 5/122* (2013.01)

(58) Field of Classification Search
CPC .... B25B 5/00; B25B 5/06; B25B 5/12; B25B 5/16; B25B 5/122
See application file for complete search history.

(56) References Cited

U.S. PATENT DOCUMENTS

| | | | | |
|---|---|---|---|---|
| 3,482,830 A | * | 12/1969 | Sendoykas | B25B 5/061 269/233 |
| 3,565,415 A | * | 2/1971 | Blatt | B25B 5/064 269/228 |
| 5,823,519 A | * | 10/1998 | Tunkers | B25B 5/122 269/201 |

(Continued)

FOREIGN PATENT DOCUMENTS

| | | |
|---|---|---|
| DE | 295 16 531 U1 | 12/1995 |
| EP | 1 398 115 A2 | 3/2004 |
| EP | 2 777 634 A1 | 9/2014 |

OTHER PUBLICATIONS

Pastramas, Nikolaos, "International Search Report and Written Opinion of the International Searching Authority for International Application No. PCT/EP2015/067528," European Patent Office, dated Apr. 7, 2016.

*Primary Examiner* — Tyrone V Hall, Jr.

(74) *Attorney, Agent, or Firm* — Florek & Endres PLLC

(57) ABSTRACT

An actuating device comprising a housing inside of which an actuating element is provided, the actuating element being slidably displaceable along a first axis between a first operative position and a second non-operative position, the displacement between the first operative position and the second non-operative position defining the stroke of the actuating element; a manual operating element pivotably connected to the housing at a first pivoting axis and coupled to the actuating element through a linkage, so that the linkage produces a translation of the actuating element, upon (Continued)

rotation of the manual operating element; the linkage comprising at least one lever arm coupled to a respective driver member, wherein the driver member is guided and constrained into a respective blind seat provided on the actuating element, characterized in that the lever arm is slidably coupled to the driver member and the driver member is movably constrained into the blind seat.

23 Claims, 8 Drawing Sheets

(56) References Cited

U.S. PATENT DOCUMENTS

| | | | | |
|---|---|---|---|---|
| 6,115,898 | A * | 9/2000 | Sawdon | B25B 5/087 269/233 |
| 6,416,045 | B1 * | 7/2002 | Morroney | B25B 5/122 269/228 |
| 6,814,349 | B2 * | 11/2004 | Migliori | B25B 5/122 269/228 |
| 6,908,077 | B2 * | 6/2005 | Sawdon | B25B 5/064 269/32 |
| 8,136,803 | B2 * | 3/2012 | McIntosh | B25B 5/122 269/140 |
| 9,440,318 | B1 * | 9/2016 | Tibbets | B25B 27/02 |
| 2010/0044942 | A1 * | 2/2010 | Tamai | B25B 5/122 269/32 |

* cited by examiner

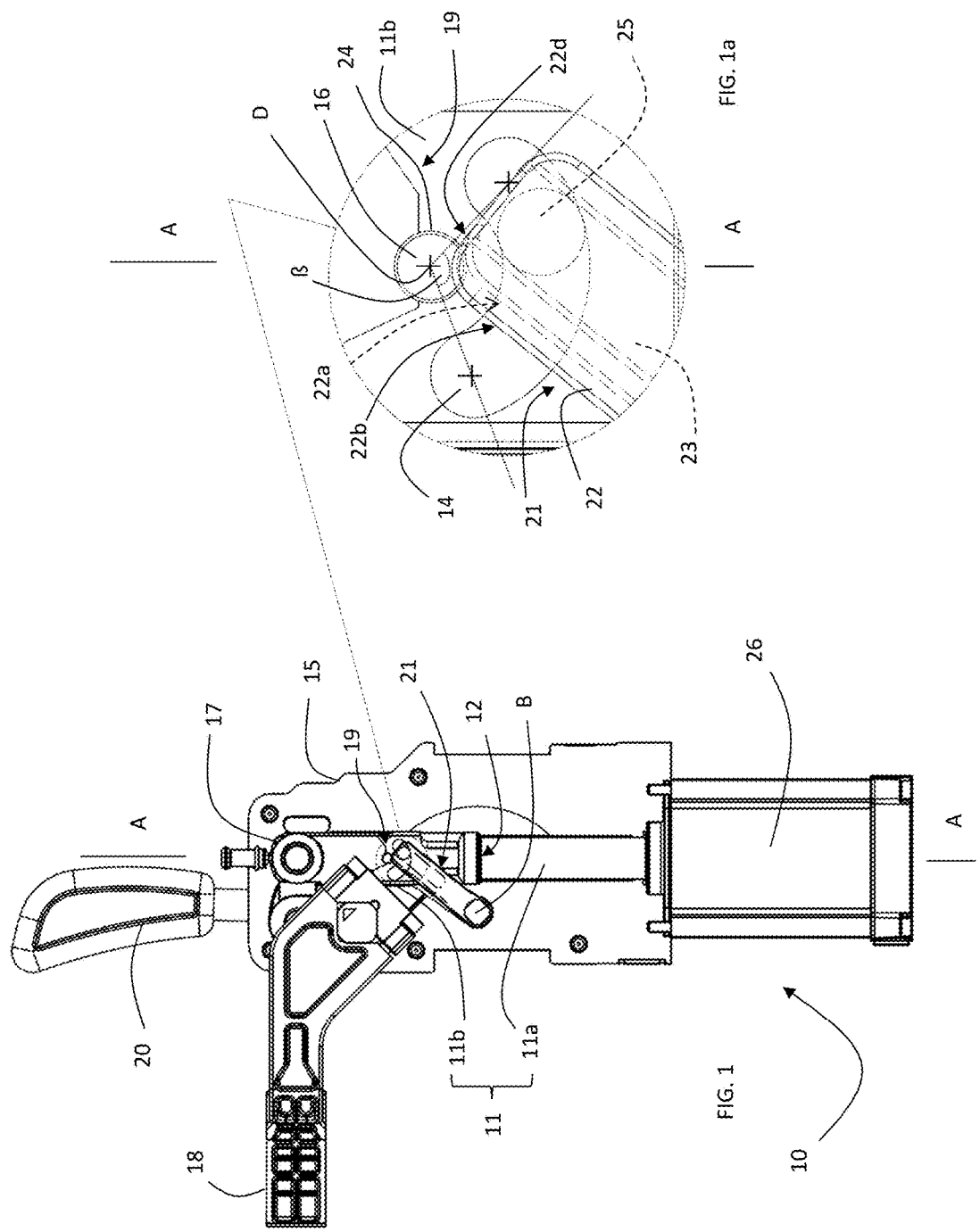

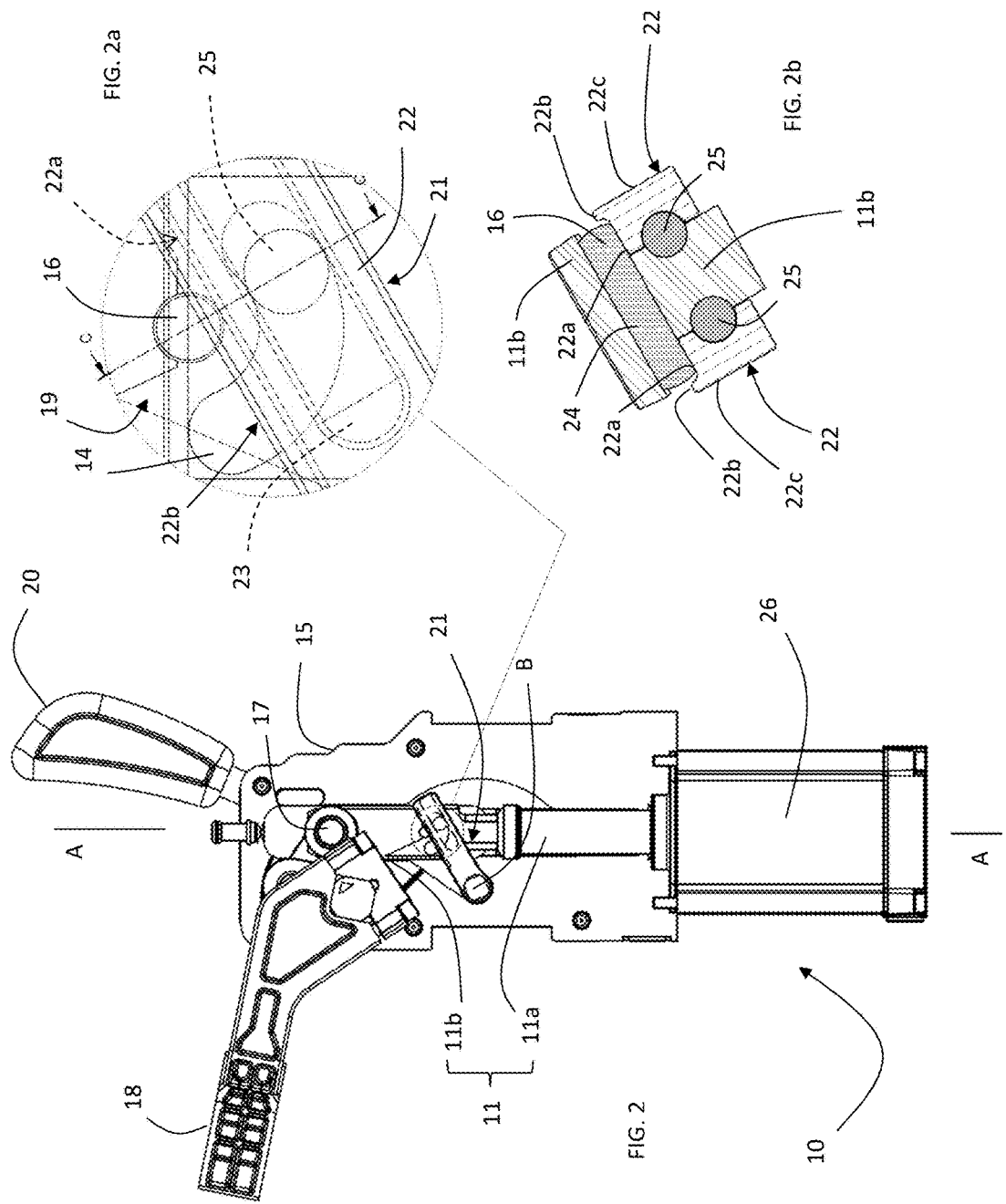

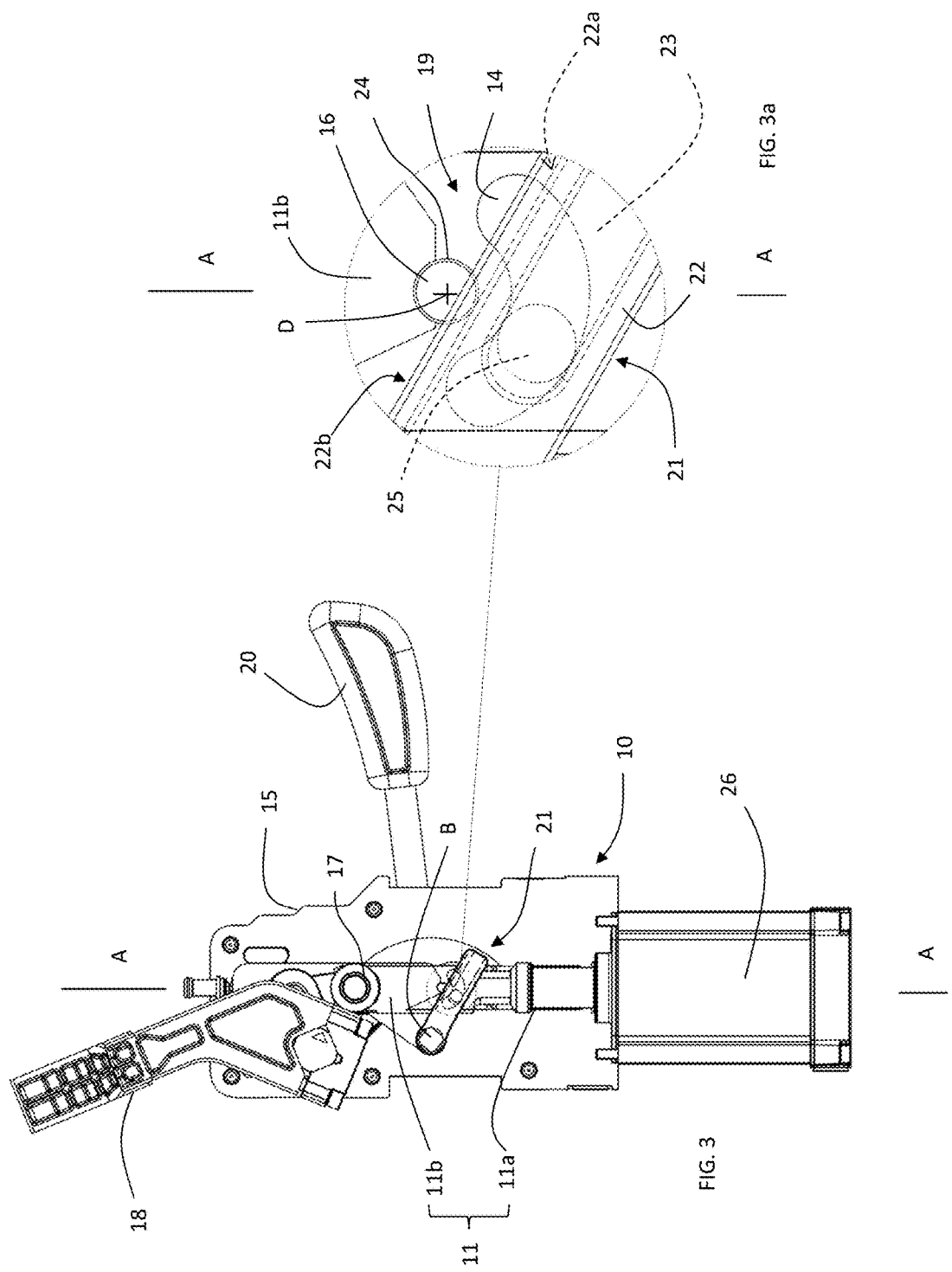

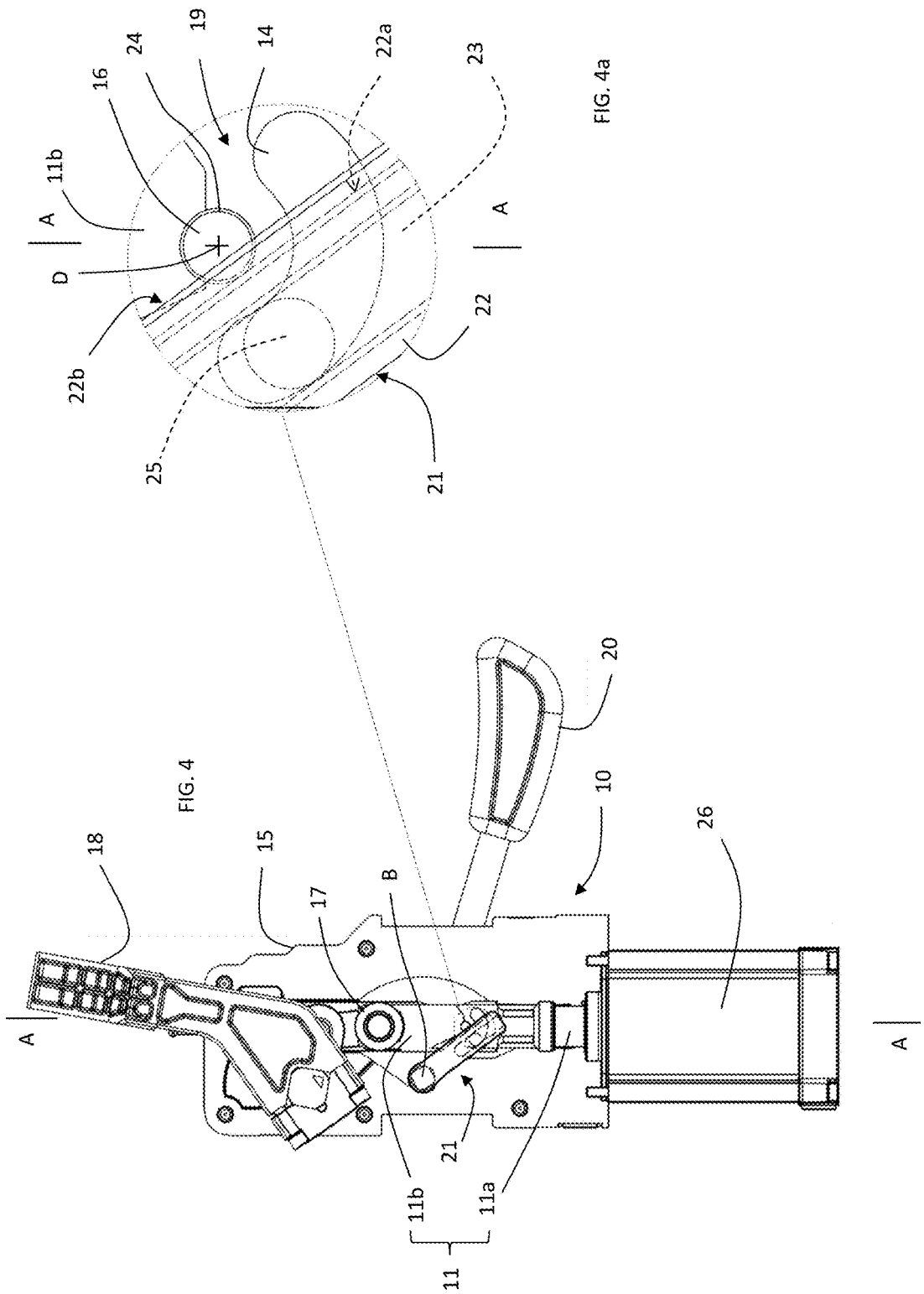

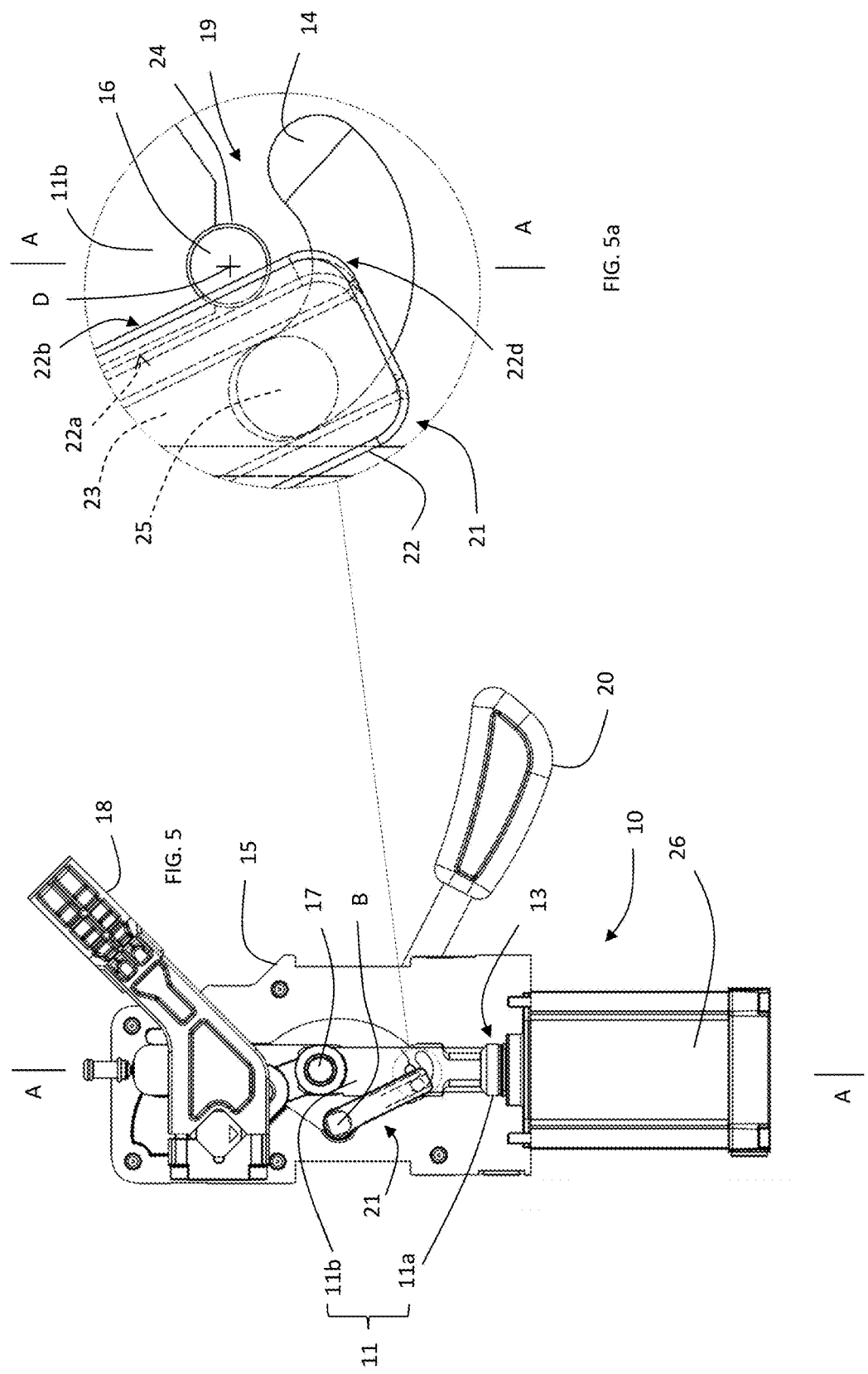

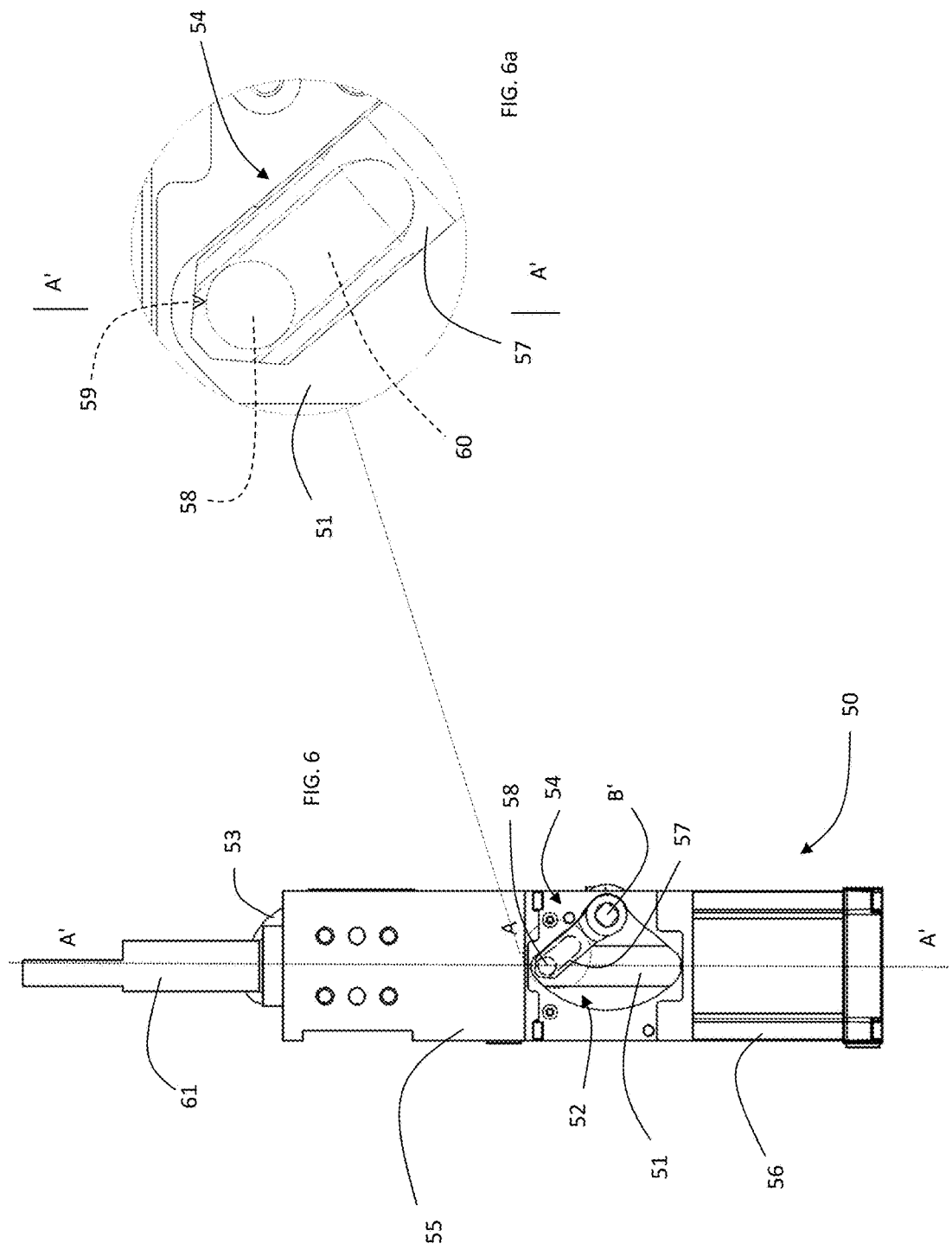

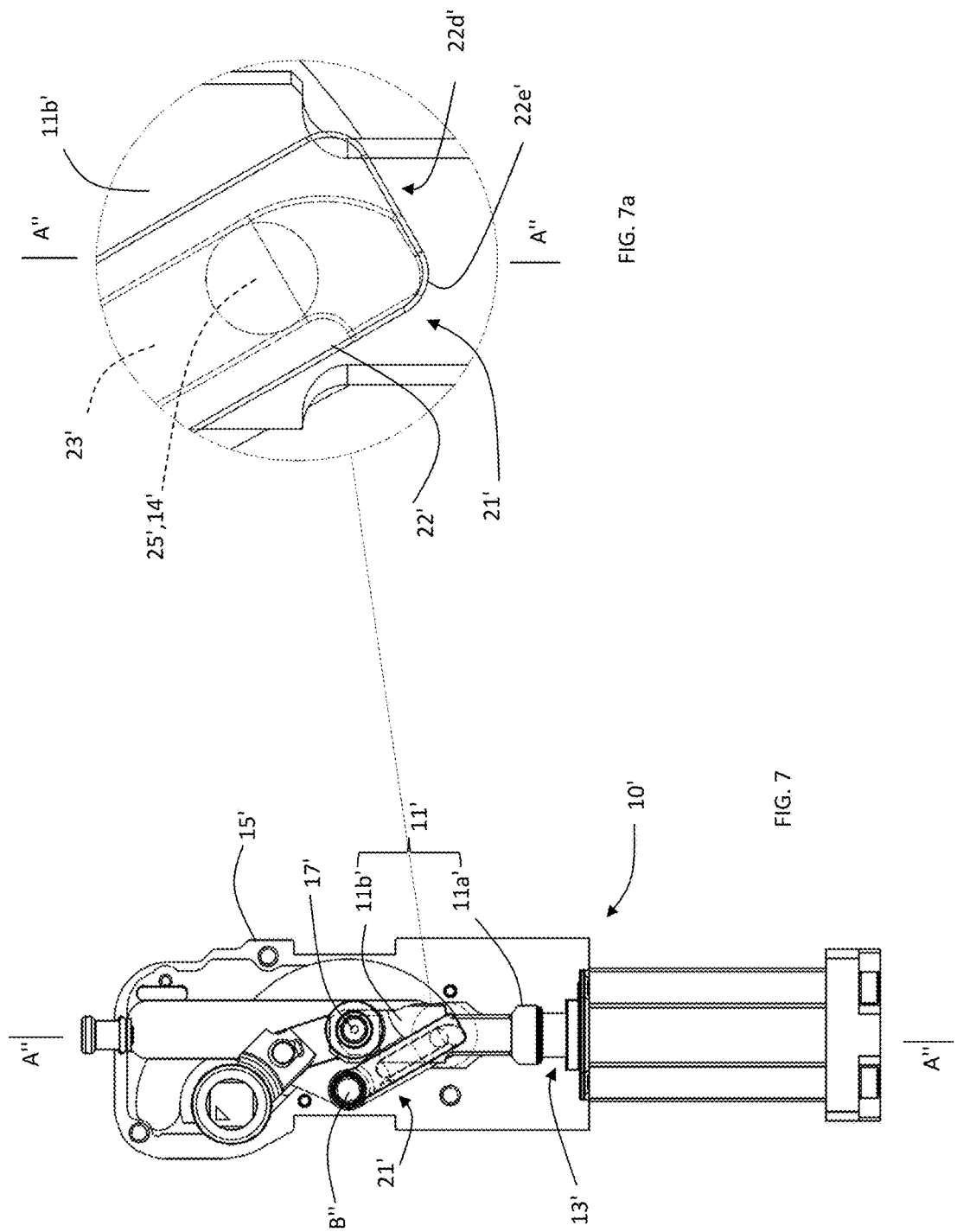

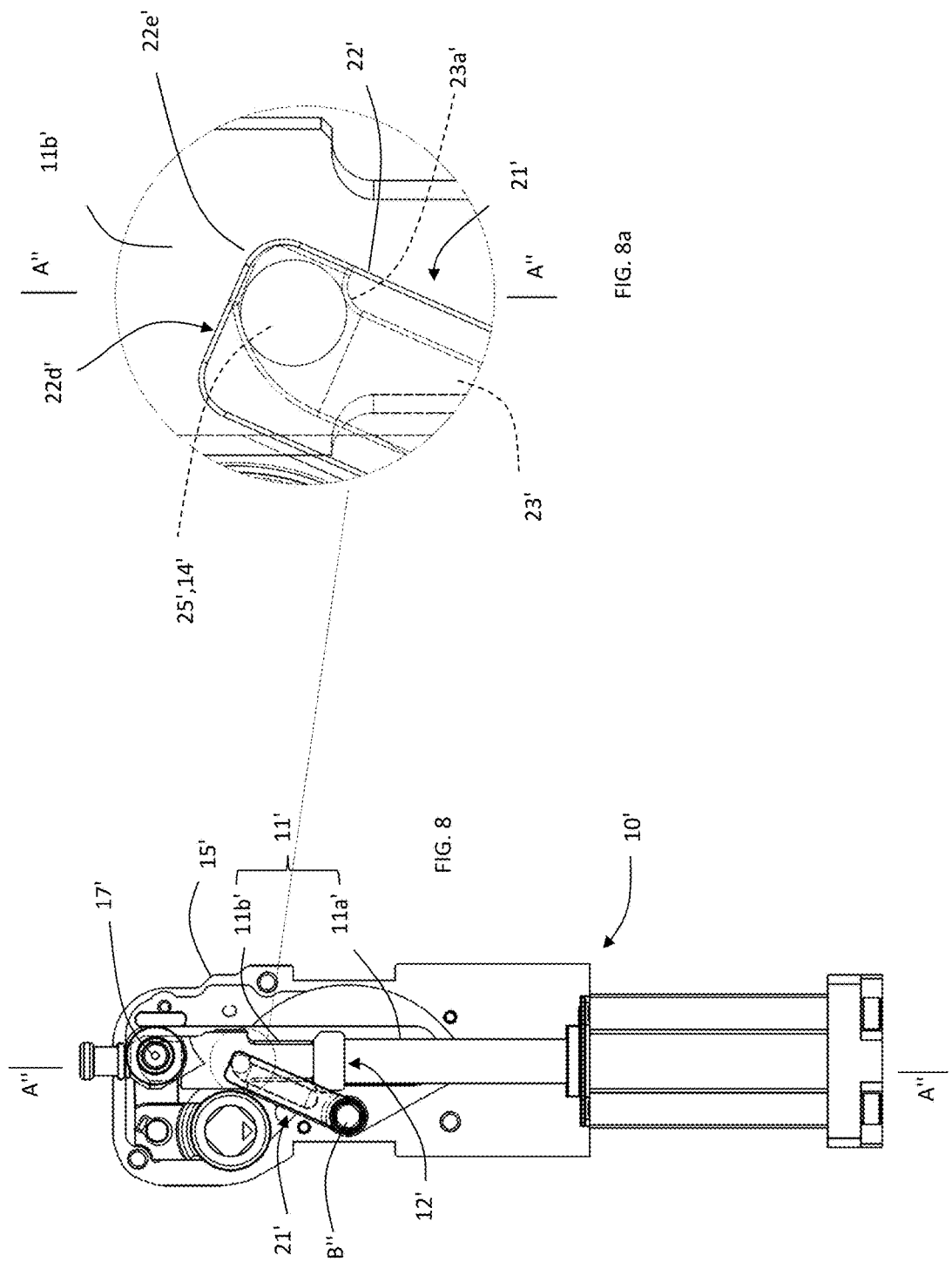

ACTUATING DEVICE OF THE TYPE PROVIDED WITH AN ACTUATING ELEMENT AND MEANS FOR MANUALLY OPERATING THE ACTUATING ELEMENT

BACKGROUND TO THE INVENTION

The present invention relates to an actuating device of the type provided with an actuating element and means for manually operating the actuating element, particularly for moving the actuating element between an operative and a non-operative end position. In detail, the present invention relates to an actuating device typically used for handling elements during metalworking processes, e.g. in welding lines of the vehicle body construction industry.

In metalworking processes, the actuating devices are usually provided with manual operating means (in addition to or substitution of pneumatic operating means) by means of which the movement of the actuating element (between its operative and non-operative end positions) is usually triggered.

Typical actuating devices used in the vehicle body construction industry and provided with manual operating means are clamping units or power clamps, pivoting units or power pivots, gripper units, pin clamps and retractable locating pin packages. By way of example, in clamping units the actuating element comprises a piston rod connected to a fork linkage. The group consisting of the piston rod and the fork linkage moves between two end positions, thereby displacing an articulated lever mechanism which, on its turn, causes a clamping arm to rotate.

RELATED ART

Nowadays, many different solutions of actuating devices used in the vehicle body construction industry are known, which are provided with manual operating means. For example, in case of clamping units, it is known to connect an operating handle directly to the clamping arm. This leads to the disadvantage of strong limitations on the types of clamping arms which can be used. Furthermore, in these known devices the manual operating handle is positioned very near to the clamping arm, thereby leading to dangerous situations due to the proximity of the hand of the user to the clamping arm during operation of the handle.

Other types of known actuating devices are provided with manual operating means which are integral to the actuating element without preserving the integrity of the housing or with manual operating means which are not able to bring the actuating element into its engaged operating position. By way of example, the engaged operating position of clamping units is the position which assures the irreversibility of the clamping arm from the clamped condition. Consequently, clearances and working tolerances may cause a backward rotation of the clamping arm.

Nowadays examples of actuating devices provided with manual operating means which do not directly act on the clamping arm and which assure that the integrity of the housing is preserved and that the engaged operating position is effectively reached, are already known from documents DE 295 16 531, EP 1 398 115 and EP 1 329 292.

Documents EP 1 398 115 and EP 1 329 292 describe both a clamping unit provided with a second articulated lever mechanism which is directly operated by a manual operating handle and hinged to the actuating element of the clamping unit, so as to transform a rotation imparted by the manual operating handle into a translation of the piston rod and the fork linkage.

Applicant realized that the double articulated lever mechanism described in EP 1 398 115 and EP 1 329 292 implies that the handle rotation area is wider than the opening angle range of the clamping arm.

The solution described in document DE 295 16 531 relates to a clamping unit provided with a second articulated lever mechanism which is directly operated by the control lever and constrained to the actuating element of the clamping unit by means of a driver member fixedly connected at one end of the second articulated lever, wherein the driver member is free to translate within a linear guide obtained in the fork linkage connected to the piston rod. The displacement of the driver member within the linear guide induces a translation of the piston rod and fork linkage along a direction perpendicular to the linear guide.

Applicant noticed, however, that this solution is subject to high wearing of the moving parts, particularly of the driver member translating into the linear guide, which are also the means which transfer the force imparted on the manual operating handle to the actuating element.

Furthermore applicant realized that, according to this solution, the manual operating handle covers a wide angular distance in order to displace the actuating element between its end-positions. This leads to an overall wide size of the clamping unit which has to be taken into account for assuring that no interference with other plant parts takes place during operations.

SUMMARY OF THE INVENTION

The above considered, Applicant contemplated the problem of obviating the above mentioned drawbacks and, in particular, of providing an actuating device capable of effectively transferring the force imparted on the manual operating handle to the actuating element, is not subject to high wearing and, at the same time, has an overall external reduced size.

Accordingly, the present invention relates to an actuating device comprising:
 a housing inside of which an actuating element is provided, the actuating element being slidably displaceable along a first axis between a first operative position and a second non-operative position, the displacement between the first operative position and the second non-operative position defining the stroke of the actuating element;
 a manual operating element pivotably connected to the housing at a first pivoting axis and coupled to the actuating element through a linkage, so that the linkage produces a translation of the actuating element, upon rotation of the manual operating element;
 the linkage comprising at least one lever arm coupled to a respective driver member, wherein the driver member is guided and constrained into a respective blind seat provided on the actuating element,
characterized in that the lever arm is slidably coupled to the driver member and the driver member is movably constrained into the blind seat.

This advantageously allows achieving an actuating device provided with a manual operating element or manual lever which covers a reduced angular distance while displacing the actuating element between its end-positions. By way of example, in a clamping unit according to the invention, the angular displacement of the manual lever is less than the angular distance covered by the clamping arm. This is advantageously due to the fact that the lever arm is not constrained fixedly to the driver member, but rather a relative sliding is possible.

Furthermore, compared to the prior art where the driver member is fixedly connected to the outer end of the lever arm, the actuating device according to the invention is subject to less wearing since the driver member is movably constrained into a blind seat and just acts as movable connection between the lever arm and the actuating element, and is less involved in transferring forces.

Preferably, the at least one lever arm is integral or fixedly connected to the manual operating element.

Preferably, the at least one lever arm has a straight extension.

Advantageously, this allows a more effective transfer of forces from the manual operating element to the actuating element.

Preferably, the at least one lever arm comprises a linear guide, parallel to the extension of the arm, for containing and guiding the driver member in sliding movement with respect to the arm.

More preferably, the linear guide of the at least one lever arm is a guiding channel obtained on the side of the arm facing the actuating member.

Advantageously, this solution offers a reliable guiding of the relative sliding between the lever arm and the driver member with a particularly compact solution. Furthermore, the hosting of the driver member inside a guiding channel which faces the actuating member allows protecting the driver member from dirt and dust thereby preserving the movement capabilities of the driver member inside the channel.

More preferably, the linear guide develops parallel to the lever arm, substantially along its entire length, and bends towards an end corner at a free tip side of the lever arm.

Advantageously, this allows reaching the condition of irreversible engagement. In fact, when the driver member reaches a position in which it engages with the cornering surface inside the channel of the lever arm, the two elements are substantially aligned along the first axis so that a further rotation of the lever arm effectively allows transferring the pushing force along the said axis. This causes the actuating element to be reliably brought into the condition of irreversible engagement.

Preferably, the linkage comprises one single lever arm centered with respect to the actuating element.

Alternatively, the linkage is a fork lever comprising two lever arms, wherein at least one of the lever arms comprises the linear guiding channel for coupling to the driver member.

Even more preferably, each lever arm of the fork lever comprises a linear guiding channel which faces the actuating element, wherein each side of the actuating element facing an arm of the fork lever is provided with a blind seat for guiding and constraining a respective driver member.

Preferably, each driver member is constrained into both, one blind seat of the actuating element and the respective guiding channel of the linkage lever facing the blind seat.

Expediently, this avoids that dirt and dust enter into contact with the driver member and its moving capabilities inside the blind seat and channel are maintained.

Preferably, each driver member is an element provided with a rolling surface, more preferably a cylindrical element, a spherical element, a roll or a pin.

This advantageously allows reducing wearing since the movement of the driver member inside the blind seat and channel is eased by the rolling surface.

Preferably, the blind seat is a guiding groove obtained on the actuating element which develops on a plane perpendicular to the pivoting axis along a curve having concavity directed towards the operative end-position of the actuating element stroke.

More preferably, the curved guiding groove has an angular extension comprised between 110 and 150° even more preferably between 115° and 140° with respect to a pivot point around which the driver member rotates.

Advantageously, the specific shape of the blind seat allows maintaining the most compact relative positioning between the actuating element and the lever arm which still allows transferring the forces necessary to displace the actuating element between its end-positions.

Preferably, an opposing member positioned in the proximity of the guiding groove, towards the operative end-position of the actuating element, is provided, wherein the opposing member cooperates with a pushing surface of the lever arm in order to transfer to the actuating element a force exerted by the lever arm towards the operative end-position.

Advantageously, this allows reaching the condition of irreversible engagement. In fact, when the lever arm arrives at a position in which the contact surface between the opposing member and the pushing surface of the lever arm is substantially perpendicular to the first axis a further counter-clockwise rotation of the lever arm effectively acts on the opposing member so as to transfer the pushing force along the first axis and move the actuating element towards the engaged operative end-position.

More preferably, the opposing member is centrally positioned with respect to the extension of the guiding groove of the actuating element.

Expediently this allows correctly transferring the forces from the lever arm to the actuating member along the first axis, in order to displace the actuating member from the non-operative to the operative position.

More preferably, the opposing member is pivotally coupled to the actuating element at a second pivoting axis.

Even more preferably, the opposing member is inserted into a seat extending along the second pivoting axis.

Even more preferably, the opposing member is a pin, a bush, a roller bearing or a ball bearing.

This advantageously allows reducing wearing of the opposing member since a relative sliding between the lever arm and the opposing member is eased by the pivoting movement of the opposing member.

Preferably, the at least one lever arm comprises a peripheral nose running along at least a portion of the perimeter of its outer side.

Expediently, the peripheral nose keeps the opposing member into position by avoiding an axial sliding of the opposing pin outside of its seat on the actuating element.

Preferably, an area of reduced thickness is provided on the actuating element, the area of reduced thickness allowing the rotating movement of the at least one lever arm.

More preferably, the area of actuating element complementary to the area of reduced thickness adjoins an opposing member seat.

This advantageously allows that the opposing member acts on a bigger surface so that the forces are more uniformly transferred.

Preferably, the actuating device is a clamping unit and the actuating element comprises a piston rod connected to a fork linkage, wherein the group made of the piston rod and the fork linkage act on an articulated lever or cam mechanism for actuating the rotation of a clamping arm.

More preferably, the guiding groove is obtained on the fork linkage of the actuating element.

According to further embodiments, the actuating device is a pivoting unit, a gripper unit or a pin clamp.

According to a still further embodiment, the actuating device is a pin unit, preferably a retractable locating pin package, and the actuating element comprises a rod connected to a shaft.

Preferably, the blind seat is obtained on the rod of the actuating element.

BRIEF DESCRIPTION OF THE FIGURES

With reference to the attached drawings, further features and advantages of the present invention will be shown by means of the following detailed description of one of its preferred embodiments. According to the above description, the several features of the described embodiment can be unrestrictedly and independently combined with each other in order to achieve the advantages specifically deriving from a certain combination of the same.

In the said drawings,

FIGS. 1 and 1a are respectively a side view of a first embodiment of the actuating device according to the invention in an open configuration and with the actuating element in its engaged operative end-position and a related enlarged detail;

FIGS. 2 and 2a are respectively a side view of the actuating device of FIG. 1 with the actuating element in a position near to the operative end-position and a related enlarged detail;

FIG. 2b is a cross section along line C-C of FIG. 2a;

FIGS. 3 and 3a are respectively a side view of the actuating device of FIG. 1 with the actuating element in a first intermediate position between the operative and non-operative end-position and a related enlarged detail;

FIGS. 4 and 4a are respectively a side view of the actuating device of FIG. 1 with the actuating element in a second intermediate position between the operative and non-operative end-position and a related enlarged detail;

FIGS. 5 and 5a are respectively a side view of the actuating device of FIG. 1 with the actuating element in its non-operative end-position and a related enlarged detail;

FIGS. 6 and 6a are respectively a side view of a second embodiment of the actuating device according to the invention in an open configuration and with the actuating element in its engaged operative end-position and a related enlarged detail;

FIGS. 7 and 7a are respectively a side view of a third embodiment of the actuating device according to the invention with the actuating element in its non-operative end-position and a related enlarged detail FIGS. 8 and 8a are respectively a side view of the embodiment of FIG. 7 with the actuating element in its engaged operative end-position and a related enlarged detail.

DETAILED DESCRIPTION OF CURRENTLY PREFERRED EMBODIMENTS OF THE INVENTION

In FIGS. 1 to 5 a first embodiment of an actuating device according to the present invention is globally indicated with 10. The actuating device according to the first embodiment is a clamping unit.

The clamping unit 10 comprises a housing 15 inside of which an actuating element 11 is provided, wherein the actuating element comprises a piston rod 11a connected to a fork linkage 11b. The actuating element 11 acts on an articulated lever 17 or cam mechanism for actuating the rotation of a clamping arm 18. The actuating element 11 is linearly displaceable along a first axis A, between a first operative 12 (shown in FIG. 1) and a second non-operative 13 (shown in FIG. 5) position, which correspond to the operative and a non-operative angular positions of the clamping arm, respectively.

The clamping unit 10 is provided with pneumatic operating means 26, particularly a double-acting pneumatic cylinder, and manual operating means 20. The manual operating means 20 comprise a control handle which is pivotally connected to the clamping unit housing 15 at a first pivoting axis B. The handle 20 is coupled to the actuating element 11 by means of a linkage 21. The linkage 21 is fixedly connected to the handle 20 so that a rotation of the handle 20 causes the linkage 21 to rotate correspondingly. The linkage 21 is furthermore coupled with the actuating element 11 so that a rotation of the linkage 21 determines an axial translation of the actuating element 11 along the axis A.

The linkage 21 of the actuating device 10 according to the depicted embodiment is a fork linkage comprising two straight lever arms 22 which embrace the fork linkage 11b of the actuating element 11. Each of the two lever arms 22 is pivotally and slidably connected to the fork linkage 11a of the actuating element 11 by means of a driver member 25 which is movably constrained in a blind seat 14 provided on the actuating element 11 and in a linear guide 23 obtained in the corresponding lever arm 22 facing the blind seat 14.

In detail, the linear guide 23 is a channel graved into the side of the lever arm 22 which faces the actuating element 11 and substantially runs along a portion of the lever arm 22. The channel guide 23 develops parallel to the extension of the arm 22 and is shaped so as to contain and guide the driver member 25 in sliding movement with respect to the arm 22. Thus, the lever arm 22 is slidably coupled to the driver member 25 in that the driver member can slide inside the channel guide 23.

According to the first embodiment, the blind seat 14 is a guiding groove that develops on a plane perpendicular to the first pivoting axis B along a curved line which has concavity directed towards the operative end-position 12 of the actuating element. The curved line has angular extension substantially equal to 119° with respect to the pivot point D around which the driver member 25 rotates while moving within the guiding groove 14.

Both, the linear channel 23 and the guiding groove 14 define a rounded seat for the driver member 25 which in this specific embodiment is a spherical element. This allows the driver member 25 to rotate inside the channel 23 and groove 14 thereby moving by extremely reduced wearing.

On the actuating element 11 there is moreover an opposing member 16 which is shaped as an idle pin in the depicted embodiment. The idle pin 16 rests in a through seat 24 obtained in the actuating element 11 and is pivotally coupled to the same 11 at a second pivoting axis D.

As shown in detail in FIG. 2b, the idle pin 16 crosses the body of the actuating member 11 and shows up at both opposite sides of the actuating member 11. The idle pin 16 is positioned near-by the guiding groove 14. Particularly, the idle pin 16 is displaced from the guiding groove 14 towards the operative end-position 12 of the actuating element, at the pivot point D around which the driver member 25 rotates.

The lever arm 22 cooperates with the idle pin 16 in that, during movement of the actuating member 11 from the non-operative position 13 to the operative position 12, a pushing surface 22a of the lever arm is always in contact with the idle pin 16 and transfers to the pin 16 the force imparted through the rotation of the handle 20.

The pushing surface 22a of the lever arm 22 comprises mainly the surface of the side mainly directed towards the operative position 12 and at least part of the tip side 22d of the lever arm.

An outer side 22c of the lever arm 22 has a width which is slightly greater than the width of the inner side on which the channel 23 is graved, thereby defining a peripheral nose 22b which runs along the side of the lever arm which faces the operative position 12. In detail, the pushing surface 22a is placed underneath the peripheral nose 22b.

On the fork linkage 11b of the actuating element 11 there is an area of reduced thickness 19 which allows the rotating movement of the at least one lever arm 22.

In detail, the area of reduced thickness 19 only partially surrounds the through seat 24 of the opposing member 16. Specifically, towards the operative position 12, the through seat 24 of the opposing member 16 has a greater extension so that the opposing member 16 transfers forces more effectively to a larger surface.

The functioning of the actuating device 10 according to the first embodiment of the invention is the following.

Starting from the non-operative configuration of the actuating device 10, shown in FIG. 5, a counter-clockwise rotation of the handle 20 determines a corresponding rotation of the linkage 21 and related lever arms 22 (see sequence of FIGS. 4, 3, 2 and 1).

During most of the stroke of the actuating element 11, the pushing surfaces 22a of each lever arm 22 act on respective portions of the idle pin 16 which projects from opposite sides of the actuating element 11. The force imparted by the rotation of the handle 20 is transferred to the idle pin 16 and causes a translation of the actuating element 11 towards its operative position 12.

During translation of the actuating element 11, the driver members 25 are free to move within the linear channels 23 of the arms 22 and the corresponding guiding grooves 14. This allows substantially reducing the required distance between the first pivoting axis B of the lever arms 22 and the axis A of the actuating element 11, since the coupling point between the lever arm 22 and the actuating element 11 is not fixed with respect to the lever arm, but movable. An overall reduced size of the actuating device can be thus achieved.

When the operative position 12 is almost achieved, the lever arm 22 reaches a position in which the contact surface between the idle pin 16 and the pushing surface 22a of the lever arm 22 is substantially perpendicular to the first axis A.

In this condition, a further counter-clockwise rotation of the lever arm 22 effectively acts on the idle pin 16 so as to transfer a pushing force substantially along the first axis A. This allows effectively transferring the whole imparted force thereby achieving that the actuating element 11 is moved into a condition of irreversible engagement of the articulated lever 17, as shown in FIG. 1.

From the condition of irreversible engagement shown in FIG. 1, a clockwise rotation of the handle 20 causes the dragging of the actuating element 11 towards the non-operative position 13. The force imparted by the rotation of the handle 20 (which on its turn causes the lever arms 22 to rotate) is transferred to the actuating element 11 through the driver members 25. This movement however does not imply a high wearing of the driver members 25 due to their shape (rolling surface) which minimizes friction and the fact that the driver members 25 are free to rotate into their seats 14,23.

In FIGS. 6 and 6a a second embodiment of an actuating device according to the present invention is globally indicated with 50. The actuating device according to the embodiment of FIG. 6 is a retractable locating pin package.

The pin package 50 comprises a housing 55 inside of which an actuating element 51 is provided. The actuating element comprises a rod linearly displaceable along a sliding axis A', between a first operative 52 (shown in FIG. 6) and a second non-operative (not shown) position, for actuating the displacement of a retractable shaft 61.

The pin package 50 is provided with pneumatic operating means 56 and manual operating means 53. The manual operating means 53 comprise a control handle which is pivotally connected to the clamping unit housing 55 at a first pivoting axis B'. The handle 53 is coupled to the actuating element 51 by means of a linkage 54. The linkage 54 is fixedly connected to the handle 53 so that a rotation of the handle 53 causes the linkage 54 to rotate correspondingly. The linkage 54 is furthermore coupled with the actuating element 51 so that a rotation of the linkage 54 determines an axial translation of the actuating element 51 along the axis A'.

The linkage 54 of the pin package 50 is a fork linkage comprising two straight lever arms 57 which embrace the rod of the actuating element 51. Each of the two lever arms 57 is pivotally and slidably connected to the rod of the actuating element 51 by means of a driver member 58 which is movably constrained in a blind seat 59 provided on the actuating element 51 and in a linear guide 60 obtained in the corresponding lever arm 57 facing the blind seat 59.

In detail, the linear guide 60 is a channel graved into the side of the lever arm 57 which faces the actuating element 51 and substantially runs along a portion of the lever arm 57. The channel guide 60 develops parallel to the extension of the arm 57 and is shaped so as to contain and guide the driver member 58 in sliding movement with respect to the arm 57. Thus, the lever arm 57 is slidably coupled to the driver member 58 in that the driver member can slide inside the channel guide 60.

According to the second embodiment, the blind seat 59 is a hemispherical blind seat. Also, the linear channel 60 defines a rounded seat for the driver member 58 which in this specific second embodiment is a spherical element. This allows the driver member 58 to rotate inside the channel 60 and the seat 59 thereby highly reducing wearing.

The functioning of the actuating device 50 according to the second embodiment of the invention is the following.

Starting from a non-operative configuration of the actuating device 50, a counter-clockwise rotation of the handle 53 determines a corresponding rotation of the linkage 54 and related lever arms 57. The rotation of the lever arms 57 causes the dragging of the actuating element 51 towards the operative end-position 12 shown in FIG. 6.

Accordingly, from the operative end-position shown in FIG. 6, a clockwise rotation of the handle 53 causes the dragging of the actuating element 51 towards the non-operative position (not shown).

The force imparted by the rotation of the handle 53 (which on its turn causes the lever arms 57 to rotate) is transferred to the actuating element 51 through the driver members 58. This movement however does not imply a high wearing of the driver members 58 due to their shape (rolling surface) which minimizes friction and the fact that the driver members 58 are free to rotate into their seats 59,60.

In FIGS. 7, 7a, 8 and 8a a third embodiment of an actuating device according to the present invention is globally indicated with 10'.

The actuating device 10' according to the third embodiment is a clamping unit which mainly corresponds to the clamping unit 10 according to the first embodiment.

It is namely provided with manual operating means (not shown) which comprise a control handle pivotally connected to the clamping unit housing 15' at a first pivoting axis B".

The handle is coupled to the actuating element 11' by means of a linkage 21' which induces an axial translation of the actuating element 11' along the axis A" upon being driven in rotation by the handle.

Also in this case, the linkage 21' is a fork linkage comprising two straight lever arms 22' which embrace the fork linkage 11b' of the actuating element 11'. Each of the two lever arms 22' is pivotally and slidably connected to the fork linkage 11a' of the actuating element 11' by means of a driver member 25' which is movably constrained in a blind seat 14' provided on the actuating element 11' and in a linear guide 23' obtained in the corresponding lever arm 22' on the side facing the blind seat 14'.

In detail, the linear guide 23' is a channel graved into the side of the lever arm 22' which faces the actuating element 11' and substantially runs along a portion of the lever arm 22'. The channel guide 23' develops parallel to the arm 22', substantially along its entire length. At the open end of the lever arm 22', the channel guide 23' bends towards the lower end corner 22e' at the tip side 22d' of the lever arm 22'.

The channel guide 23' is shaped so as to contain and guide the driver member 25' in sliding movement with respect to the arm 22'. Thus, the lever arm 22' is slidably coupled to the driver member 25' in that the driver member can slide inside the channel guide 23'.

According to this third embodiment, the blind seat 14' is a hemispherical blind seat. In addition, the linear channel 23' defines a rounded seat for the driver member 25' which in this specific third embodiment is a spherical element. This allows the driver member 25' to rotate inside the channel 23' and the seat 14' thereby highly reducing wearing.

The functioning of the actuating device 10' according to the third embodiment of the invention is the following.

Starting from a non-operative configuration 13' of the actuating device 10' shown in FIG. 7, a rotation of the handle determines a corresponding rotation of the linkage 21' and related lever arms 22'. The rotation of the lever arms 22' causes the dragging of the actuating element 11' towards the operative end-position 12' (shown in FIG. 8).

The force imparted by the rotation of the handle (which on its turn causes the lever arms 22' to rotate) is transferred to the actuating element 11' through the driver members 25'. This movement however does not imply a high wearing of the driver members 25' due to their shape (rolling surface) which minimizes friction and the fact that the driver members 25' are free to rotate into their seats 14' and into the channels 23'.

When the operative position 12' is almost achieved, the driver member 25' reaches a position in which it engages with the cornering surface 23a' inside the channel 23' of the lever arm 22'.

In this condition, a further rotation of the lever arm 22' effectively acts on the driver member 25' so as to transfer a pushing force substantially along the first axis A". This allows effectively transferring the whole imparted force thereby achieving that the actuating element 11' is moved into a condition of irreversible engagement of the articulated lever 17', as shown in FIG. 8.

From the condition of irreversible engagement shown in FIG. 8, a rotation of the handle in the opposite direction causes the dragging of the actuating element 11' towards the non-operative position shown in FIG. 7.

From the description provided, the features of the actuating device of the present invention are clear, as well as the related advantages appear also evident. Indeed, the actuating device according to the present invention allows bearing the loads developing at the maximum operative pressure, since it assures that the operative end-position is completely reached and the engagement condition achieved.

Furthermore, the device according to the invention has a reduced overall size also due to the reduced angular rotation area covered by the manual handle in order to displace the actuating element from the operative to the non-operative condition and vice versa.

Finally, the device according to the invention is subject to reduced wearing due to the fact that the driver members are free to move, and particularly to roll, inside their seats.

The invention claimed is:

1. An actuating device comprising:
a housing inside of which an actuating element is provided, the actuating element being slidably displaceable along a first axis between a first operative position and a second non-operative position, a displacement between the first operative position and the second non-operative position defining a stroke of the actuating element;
a manual operating element pivotably connected to the housing at a first pivoting axis and coupled to the actuating element through a linkage, so that the linkage produces a translation of the actuating element, upon rotation of the manual operating element;
the linkage comprising a fork lever having two lever arms, each lever arm comprising a linear guide channel which faces the actuating element for coupling to a driver member, wherein each side of the actuating element facing a lever arm of the fork lever comprises a blind seat for guiding and movably constraining a respective driver member,
wherein the lever arm is slidably coupled to the driver member and the driver member is movably constrained into the blind seat.

2. The actuating device according to claim 1, wherein the linear guide channel extends parallel to each lever arm, for containing and guiding the driver member in sliding movement with respect to each lever arm.

3. The actuating device according to claim 2, wherein the linear channel of each lever arm bends towards an end corner at a free tip of each lever arm.

4. The actuating device according to claim 2, wherein the linear guide channel of each lever arm is a guiding channel obtained on the side of each lever arm facing the actuating member.

5. The actuating device according to claim 1, wherein each driver member is constrained into both, one blind seat of the actuating element and the respective linear guide channel of the lever arm facing the blind seat.

6. The actuating device according to claim 1, wherein the driver member is an element provided with a rolling surface.

7. The actuating device according to claim 6, wherein the element provided with a rolling surface is a cylindrical element, a spherical element, a roll, or a pin.

8. An actuating device comprising:
a housing inside of which an actuating element is provided, the actuating element being slidably displaceable along a first axis between a first operative position and a second non-operative position, a displacement between the first operative position and the second non-operative position defining a stroke of the actuating element;

a manual operating element pivotably connected to the housing at a first pivoting axis and coupled to the actuating element through a linkage, so that the linkage produces a translation of the actuating element, upon rotation of the manual operating element;

the linkage comprising at least one lever arm coupled to a respective driver member, wherein the driver member is guided and constrained into a respective blind seat provided on the actuating element, wherein the lever arm is slidably coupled to the driver member and the driver member is movably constrained into the blind seat;

and further wherein the blind seat is a guiding groove obtained on the actuating element and develops on a plane perpendicular to the pivoting axis along a curve having concavity directed towards the operative end-position of the actuating element stroke.

9. The actuating device according to claim 8, wherein the linkage is a fork lever comprising two lever arms, wherein at least one of the two lever arms comprises a linear guiding channel for coupling to the driver member.

10. The actuating device according to claim 9, wherein each lever arm of the fork lever comprises a linear guiding channel which faces the actuating element, wherein each side of the actuating element facing an arm of the fork lever is provided with a blind seat for guiding and movably constraining a respective driver member.

11. The actuating device according to claim 8, wherein the guiding groove has an angular extension between 110° and 150°, with respect to a pivot point around which the driver member rotates.

12. The actuating device according to claim 11, wherein the guiding groove has an angular extension between 115° and 140°.

13. The actuating device according to claim 8, wherein an opposing member is provided, the opposing member being positioned in the proximity of the guiding groove, towards the operative end-position of the actuating element, the opposing member cooperating with a pushing surface of the lever arm in order to transfer to the actuating element a force exerted by the lever arm towards the operative end-position.

14. The actuating device according to claim 13 wherein the opposing member is centrally positioned with respect to the extension of the guiding groove of the actuating device.

15. The actuating device according to claim 13 wherein the opposing member is pivotally connected to the actuating element at a second pivoting axis.

16. The actuating device according to claim 8, wherein the lever arm comprises a peripheral nose running along at least a portion of the perimeter of its outer side.

17. The actuating device according to claim 8, wherein an area of reduced thickness 494 is provided on the actuating element, the area of reduced thickness allowing the rotating movement of the at least one lever arm.

18. The actuating device according to claim 17, wherein the area of actuating element complementary to the area of reduced thickness adjoins an opposing member seat.

19. The actuating device according to claim 8, wherein the actuating device is a clamping unit and the actuating element comprises a piston rod connected to a fork linkage, the group made of the piston rod and the fork linkage acting on an articulated lever or cam mechanism for actuating the rotation of a clamping arm, the guiding groove being obtained on the fork linkage of the actuating element.

20. The actuating device according to claim 8, wherein the actuating device is a pivoting unit, a gripper unit or a pin clamp, and the actuating element comprises a fork linkage, the guiding groove being obtained on the fork linkage.

21. An actuating device comprising:
a housing inside of which an actuating element is provided, the actuating element being slidably displaceable along a first axis between a first operative position and a second non-operative position, a displacement between the first operative position and the second non-operative position defining a stroke of the actuating element;

a manual operating element pivotally connected to the housing at a first pivoting axis and coupled to the actuating element through a linkage, so that the linkage produces a translation of the actuating element, upon rotation of the manual operating element;

the linkage comprising at least one lever arm having a linear channel and being coupled to a respective driver member, wherein the driver member is guided and constrained into a respective blind seat provided on the actuating element, wherein the lever arm is slidably coupled to the driver member via the linear channel and the driver member is movably constrained into the blind seat;

wherein the actuating device is a pin unit, and the actuating element comprises a rod connected to a shaft, the blind seat being obtained on the rod of the actuating element; and further wherein the blind seat is a hemispherical blind seat, the driver member is a spherical element, and the linear channel defines a rounded seat for the driver member, allowing the driver member to rotate inside the linear channel and the blind seat to reduce wear.

22. The actuating device according to claim 21 wherein the pin unit is a retractable locating pin package.

23. An actuating device comprising:
a housing inside of which an actuating element is provided, the actuating element being slidably displaceable along a first axis between a first operative position and a second non-operative position, a displacement between the first operative position and the second non-operative position defining a stroke of the actuating element;

a manual operating element pivotally connected to the housing at a first pivoting axis and coupled to the actuating element through a linkage, so that the linkage produces a translation of the actuating element, upon rotation of the manual operating element;

the linkage comprising at least one lever arm having a linear channel and being coupled to a respective driver member, wherein the driver member is guided and constrained into a respective blind seat provided on the actuating element, wherein the lever arm is slidably coupled to the driver member via the linear channel and the driver member is movably constrained into the blind seat;

wherein the actuating device is a clamping unit, and the actuating element comprises a piston rod connected to a fork linkage, the group made of the piston rod and the fork linkage acting on an articulated lever or cam mechanism for actuating the rotation of a clamping arm, the blind seat being obtained on the fork linkage of the actuating element; and further wherein the blind seat is a hemispherical blind seat, the driver member is a spherical element, and the linear channel defines a rounded seat for the driver member, allowing the driver member to rotate inside the linear channel and the blind seat to reduce wear.

* * * * *